(12) United States Patent
Chiang

(10) Patent No.: US 9,052,577 B2
(45) Date of Patent: Jun. 9, 2015

(54) DISPLAY DEVICE HAVING A DOUBLE IMAGE DISPLAY FUNCTION

(71) Applicant: FLYTECH TECHNOLOGY CO., LTD., Taipei (TW)

(72) Inventor: Chih-Kuang Chiang, Taipei (TW)

(73) Assignee: Flytech Technology Co., Ltd., Taipei (TW)

( * ) Notice: Subject to any disclaimer, the term of this patent is extended or adjusted under 35 U.S.C. 154(b) by 184 days.

(21) Appl. No.: 13/803,830

(22) Filed: Mar. 14, 2013

(65) Prior Publication Data

US 2014/0268071 A1    Sep. 18, 2014

(51) Int. Cl.
  *G03B 21/14* (2006.01)
  *G03B 21/26* (2006.01)
  *G03B 21/56* (2006.01)

(52) U.S. Cl.
  CPC .............. *G03B 21/14* (2013.01); *G03B 21/26* (2013.01); *G03B 21/56* (2013.01)

(58) Field of Classification Search
  CPC ......... G03B 21/14; G03B 21/26; G03B 21/56
  USPC ........ 353/30, 47, 74, 79, 94, 119, 122; 349/5, 349/7–9, 61
  See application file for complete search history.

(56) References Cited

U.S. PATENT DOCUMENTS

| | | | |
|---|---|---|---|
| 7,619,606 B2 * | 11/2009 | Kaehler et al. | 345/102 |
| 8,439,504 B2 * | 5/2013 | Chae et al. | 353/30 |
| 8,579,442 B2 * | 11/2013 | Plut | 353/39 |
| 2006/0017887 A1 * | 1/2006 | Jacobson et al. | 353/30 |
| 2012/0140188 A1 * | 6/2012 | Yasuda et al. | 353/69 |
| 2013/0258289 A1 * | 10/2013 | Aruga et al. | 353/30 |

\* cited by examiner

*Primary Examiner* — Sultan Chowdhury
(74) *Attorney, Agent, or Firm* — Rosenberg, Klein & Lee

(57) ABSTRACT

A display device having a double image display function includes a base unit, a support unit, a first image display unit, a second image display unit and an image projecting unit. The base unit includes a base body. The support unit includes a support structure disposed on the base body. The first image display unit includes at least one image display screen movably disposed on the support structure for displaying a first predetermined image. The second image display unit includes at least one projection plate movably disposed on the base body. The image projecting unit includes an image projecting module movably disposed on the image display screen. An image light beam generated by the image projecting module is projected onto the projection plate to display a second predetermined image on the projection plate. Thus, the same or different displaying images can be respectively shown on different viewing planes.

18 Claims, 9 Drawing Sheets

DISPLAY DEVICE HAVING A DOUBLE IMAGE DISPLAY FUNCTION

BACKGROUND OF THE INVENTION

1. Field of the Invention

The instant disclosure relates to a display device, and more particularly to a display device having a double image display function.

2. Description of Related Art

Because LCDs are thin, light, and small, and consume a small amount of power, LCDs are widely applied to information apparatus. In order to allow a user to view the display at the best possible viewing angle, there is a hinge assembly between the display panel and the base of the LCD. The hinge assembly can support the LCD and allows the viewing angle to be adjusted.

In a business conference, when the user of the LCD wishes to show a specific image to another party, the other party needs to move to the same side of the LCD, as the user is, in order to view the image together from the display. It is noted that the LCD has a relatively small screen, and it would be inconvenient for more than one person to view the image from the screen.

SUMMARY OF THE INVENTION

One aspect of the instant disclosure relates to a display device having a double image display function for respectively showing the same or different displaying images on different viewing planes.

One of the embodiments of the instant disclosure provides a display device having a double image display function, comprising: a base unit, a support unit, a first image display unit, a second image display unit and an image projecting unit. The base unit includes a base body. The support unit includes a support structure disposed on the base body. The first image display unit includes at least one image display screen movably disposed on the support structure for displaying a first predetermined image. The second image display unit includes at least one projection plate movably disposed on the base body. The image projecting unit includes an image projecting module movably disposed on the at least one image display screen, wherein an image light beam generated by the at least one image projecting module is projected onto the at least one projection plate to display a second predetermined image on the at least one projection plate.

Another one of the embodiments of the instant disclosure provides a display device having a double image display function, comprising: a base unit, a support unit, a first image display unit, a second image display unit and an image projecting unit. The base unit includes a base body, wherein the base body has a receiving space concaved inwardly from the bottom surface thereof. The support unit includes a support structure disposed on the base body. The first image display unit includes at least one image display screen movably disposed on the support structure for displaying a first predetermined image, wherein the at least one image display screen has a receiving groove concaved inwardly therefrom. The second image display unit includes at least one projection plate movably disposed on the base body, wherein the at least one projection plate is received in the receiving space of the base body. The image projecting unit includes an image projecting module movably disposed on the at least one image display screen for displaying a second predetermined image, wherein the at least one image projecting module is received in the receiving groove of the at least one image display screen.

Yet another one of the embodiments of the instant disclosure provides a display device having a double image display function, comprising: a base unit, a support unit, a first image display unit, a second image display unit and an image projecting unit. The base unit includes a base body. The support unit includes a support structure disposed on the base body. The first image display unit includes at least one image display screen movably disposed on the support structure for displaying a first predetermined image. The second image display unit includes at least one image display panel movably disposed on the base body for displaying a second predetermined image. The image projecting unit includes an image projecting module movably disposed on the at least one image display screen.

More precisely, the base unit includes a plurality of non-skid pads disposed on the bottom surface of the base body, the base body has a receiving space concaved inwardly from the bottom surface thereof and corresponding to the at least one projection plate, the base body has an assembled groove formed on the top surface thereof, and the support structure has a bottom portion inserted into the assembled groove of the base body.

More precisely, the support structure includes a fixed frame positioned on the base body and an angle adjusting element movably and pivotally disposed on the fixed frame for adjusting the inclined angle of the at least one image display screen, and the at least one image display screen is fixed on the angle adjusting element of the support structure.

More precisely, the at least one image display screen has an image display region disposed on the front surface and opposite to the at least one projection plate for showing the first predetermined image, and the first predetermined image and the second predetermined image are the same.

More precisely, the base body has a pivot groove formed on a lateral side thereof and an inclined plane disposed inside the pivot groove, the at least one projection plate has an image display portion contacting the support structure and positioned between the top surface of the base body and the support structure, an extending portion extended from the image display portion into the pivot groove and contacting the inclined plane, and a pivot portion substantially vertically extended from the extending portion and pivotally disposed in the pivot groove.

More precisely, the at least one image display screen has a receiving groove concaved inwardly from a rear face and a top face thereof and corresponding to the at least one image projecting module, and the at least one image projecting module has an end portion pivotally disposed in the receiving groove.

More precisely, the at least one image projecting module includes a first image projecting portion facing the at least one projection plate to generate the image light beam and a second image projecting portion opposite to the first image projecting portion.

More precisely, a first image light beam generated by the first image projecting portion of the at least one image projecting module is projected onto a horizontal plane adjacent to the base body.

More precisely, a second image light beam generated by the second image projecting portion of the at least one image projecting module is projected onto a vertical plane facing an image display region of the at least one image display screen.

Therefore, because the at least one image display screen can be used to display the first predetermined image by itself and the at least one projection plate can be used to display the second predetermined image on the at least one projection plate (or the at least one image display panel can be used to display the second predetermined image by itself), the same or different displaying images can be respectively shown on different viewing planes (i.e., the same or different displaying images can be shown by different viewing angles). For example, if the first predetermined image and the second predetermined image are different, the second predetermined image (such as a simple image) may be one part of the first predetermined image (such as a detailed image). Moreover, the detailed image can show complete information for a cashier or a waiter, and the simple image can show simple information for a customer.

To further understand the techniques, means and effects of the instant disclosure applied for achieving the prescribed objectives, the following detailed descriptions and appended drawings are hereby referred, such that, through which, the purposes, features and aspects of the instant disclosure can be thoroughly and concretely appreciated. However, the appended drawings are provided solely for reference and illustration, without any intention to limit the instant disclosure.

DETAILED DESCRIPTION OF THE PREFERRED EMBODIMENTS

[First Embodiment]

Figure 1:
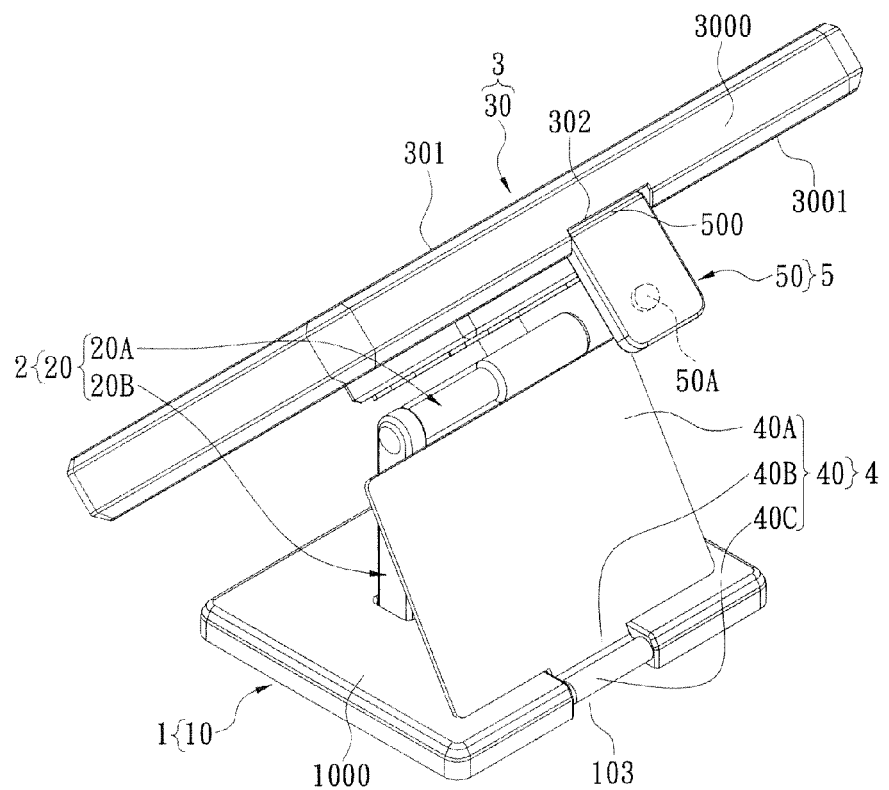
FIG. 1 shows a perspective, assembled, schematic view of the display device having a double image display function according to the first embodiment of the instant disclosure.
Figure 2:
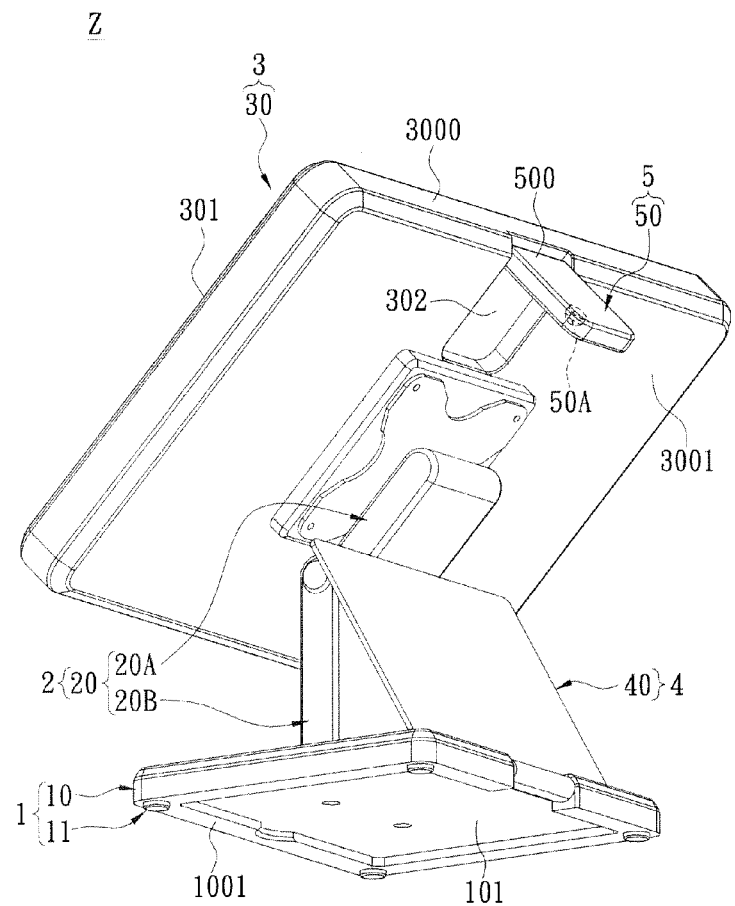
FIG. 2 shows another perspective, assembled, schematic view of the display device having a double image display function according to the first embodiment of the instant disclosure.
Figure 3:
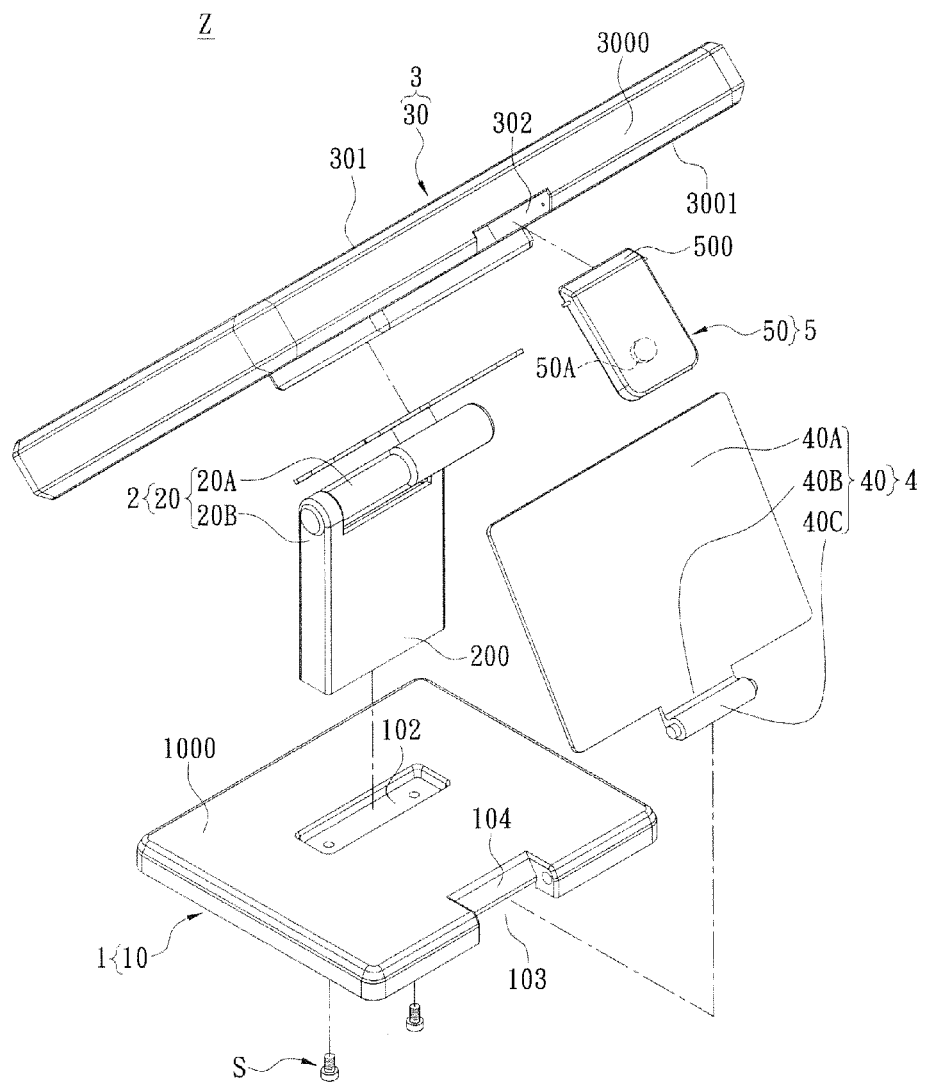
FIG. 3 shows a perspective, exploded, schematic view of the display device having a double image display function according to the first embodiment of the instant disclosure.

Referring to FIG. 1 to FIG. 4, where the first embodiment of the instant disclosure a display device Z having a double image display function, comprising: a base unit 1, a support unit 2, a first image display unit 3, a second image display unit 4 and an image projecting unit 5.

First, the base unit 1 includes a base body 10. The support unit 2 includes a support structure 20 disposed on the base body 10. The first image display unit 3 includes at least one image display screen 30 (such as a LED display screen or a LCD display screen) movably disposed on the support structure 20 for displaying a first predetermined image (not shown). The second image display unit 4 includes at least one projection plate 40 movably disposed on the base body 10. The image projecting unit 5 includes an image projecting module 50 (such as a micro projection module) movably disposed on the at least one image display screen 30. In addition, an image light beam L generated by the at least one image projecting module 50 can be accurately projected onto the at least one projection plate 40 to display a second predetermined image (not shown) on the at least one projection plate 40, where the first predetermined image and the second predetermined image may be the same or different. Therefore, the same or different displaying images can be respectively shown on different viewing planes (i.e., the same or different displaying images can be shown by different viewing angles) by mating the at least one image display screen 30 and the at least one projection plate 40.

For example, if the first predetermined image and the second predetermined image are different, the second predetermined image (such as a simple image) may be one part of the first predetermined image (such as a detailed image). Moreover, the detailed image can show complete information for a cashier or a waiter, and the simple image can show simple information for a customer.

More precisely, the base unit 1 includes a plurality of non-skid pads 11 disposed on the bottom surface 1001 of the base body 10 for increasing the non-skid effect of the display device Z. In addition, the base body 10 has a receiving space 101 concaved inwardly from the bottom surface 1001 thereof and corresponding to the at least one projection plate 40. Because the at least one projection plate 40 can be pivotally disposed on the base body 10 (i.e., the at least one projection plate 40 can be rotated relative to the base body 10), the at least one projection plate 40 can be received in the receiving space 101 by clockwise rotating the at least one projection plate 40 to the end or can be positioned between the support structure 20 and the base body 10 by counterclockwise rotating the at least one projection plate 40 to the end. Furthermore, the base body 10 has an assembled groove 102 formed on the top surface 1000 thereof, and the support structure 20 has a bottom portion 200 inserted into the assembled groove 102 of the base body 10, where the support structure 20 can be fixed on the base body 10 through a plurality of securing elements S (such as screws).

Figure 4:
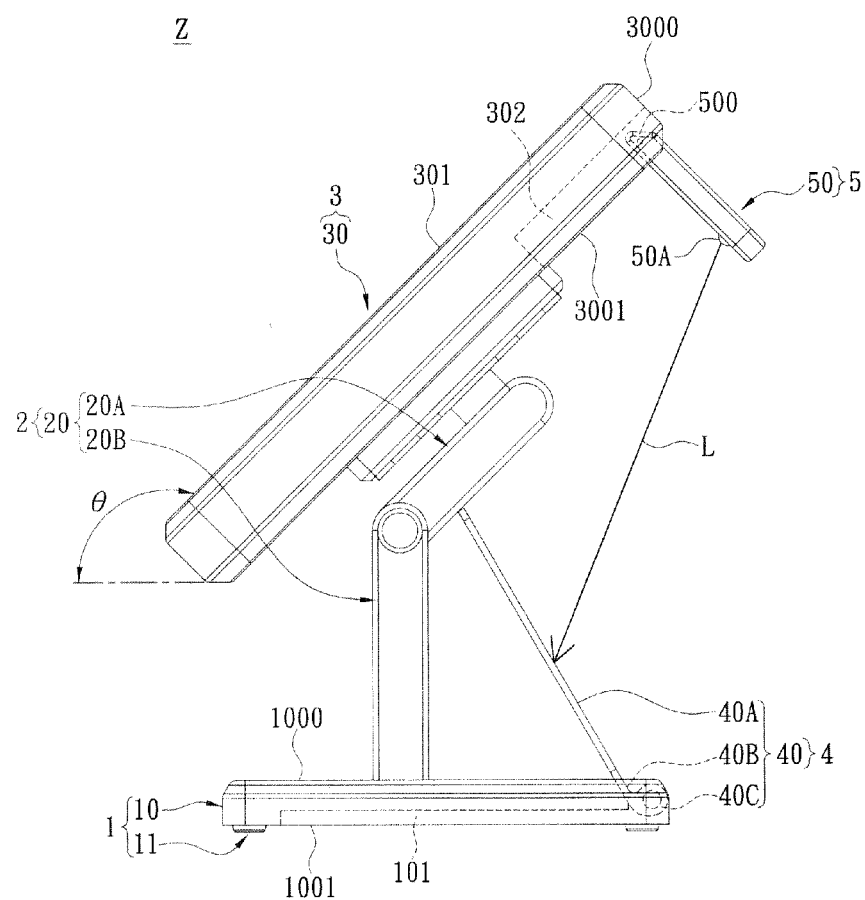
FIG. 4 shows a lateral, schematic view of the display device having a double image display function according to the first embodiment of the instant disclosure.

More precisely, the support structure 20 includes a fixed frame 20A positioned on the base body 10 and an angle adjusting element 20B movably and pivotally disposed on the fixed frame 20A, thus when the at least one image display screen 30 is fixed on the angle adjusting element 20B of the support structure 20, the inclined angle θ (as shown in FIG. 4) of the at least one image display screen 30 can be adjusted according to different viewing angles of a user.

More precisely, the base body 10 has a pivot groove 103 formed on a lateral side thereof and an inclined plane 104 disposed inside the pivot groove 103. The at least one projection plate 40 has an image display portion 40A contacting the support structure 20 and positioned between the top surface 1000 of the base body 10 and the support structure 20, an extending portion 40B extended from the image display portion 40A into the pivot groove 103 and contacting the inclined plane 104, and a pivot portion 40C substantially vertically extended from the extending portion 40B and pivotally disposed in the pivot groove 103. Of course, the at least one projection plate 40 also can be abutted against on the top surface 1000 of the base body 10 and the inclined plane 104 without contacting the support structure 20. In other words, although the at least one projection plate 40 is separated from the support structure 20, the bottom side of the image display portion 40A can be abutted against the top surface 1000 of the base body 10 and the extending portion 40B can be abutted against the inclined plane 104 of the base body 10 for positioning the at least one projection plate 40 on the base body 10.

More precisely, the at least one image display screen 30 has an image display region 301 disposed on the front surface and opposite to the at least one projection plate 40 for showing the first predetermined image. The at least one image display screen 30 has a receiving groove 302 concaved in ardly from a rear face 3001 and a top face 3002 thereof and corresponding to the at least one image projecting module 50, and the at least one image projecting module 50 has an end portion 500 pivotally disposed in the receiving groove 302. In addition, the at least one image projecting module 50 includes a first image projecting portion 50A facing the at least one projection plate 40 to generate the image light beam L. Because the at least one image projecting module 50 can be pivotally disposed on the at least one image display screen 30 (i.e., the at least one image projecting module 50 can be rotated relative to the at least one image display screen 30), the at least one image projecting module 50 can be received in the receiving groove 302 by clockwise rotating the at least one image projecting module 50 to the end or can be exposed outside the receiving groove 302 by counterclockwise rotating the at least one image projecting module 50 to the end.

[Second Embodiment]

Figure 5:
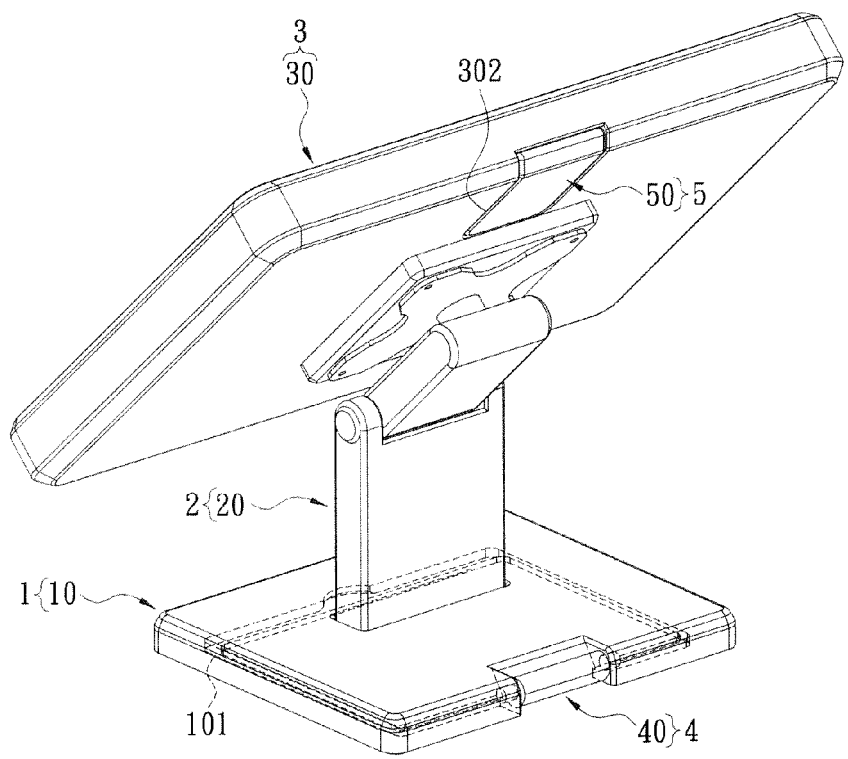
FIG. 5 shows a perspective, assembled, schematic view of the display device having a double image display function according to the second embodiment of the instant disclosure.
Figure 6:
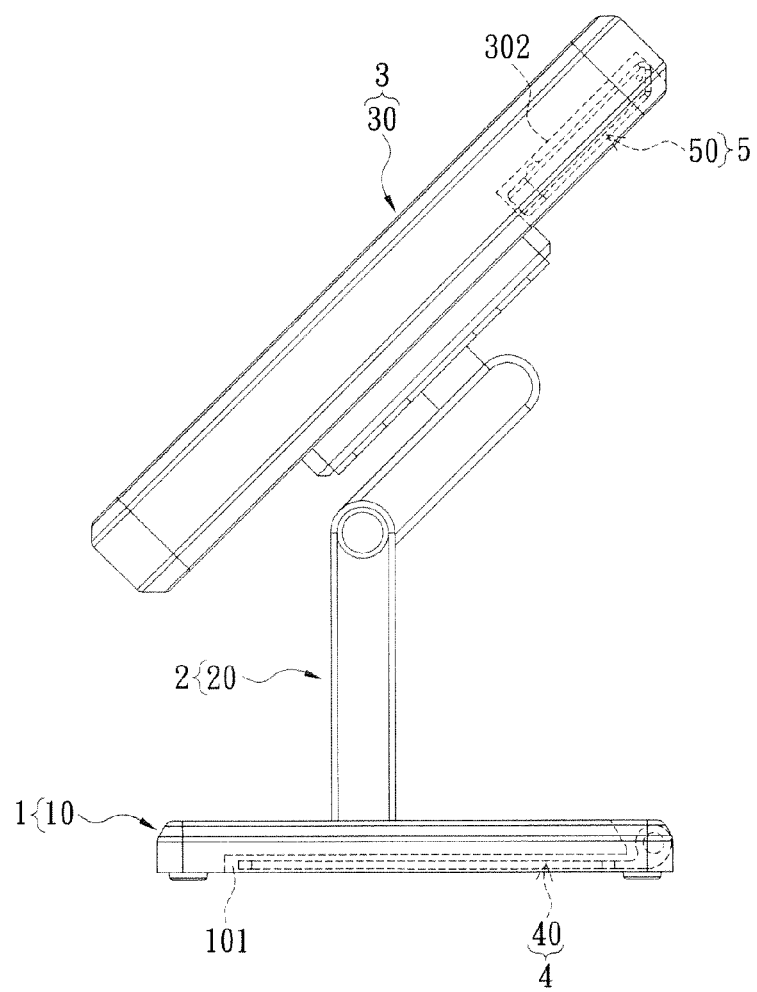
FIG. 6 shows a lateral, schematic view of the display device having a double image display function according to the second embodiment of the instant disclosure.

Referring to FIG. 5 and FIG. 6, where the second embodiment of the instant disclosure a display device Z having a double image display function, comprising: a base unit 1, a support unit 2, a first image display unit 3, a second image display unit 4 and an image projecting unit 5. The base unit 1 includes a base body 10, and the base body 10 has a receiving space 101 concaved inwardly from the bottom surface 1001 thereof. The support unit 2 includes a support structure 20 disposed on the base body 10. The first image display unit 3 includes at least one image display screen 30 movably disposed on the support structure 20 for displaying a first predetermined image (not shown), and the at least one image display screen 30 has a receiving groove 302 concaved inwardly therefrom. The second image display unit 4 includes at least one projection plate 40 movably disposed on the base body 10, and the at least one projection plate 40 is received in the receiving space 101 of the base body 10. The image projecting unit 5 includes an image projecting module 50 movably disposed on the at least one image display screen 30 for displaying a second predetermined image (not shown), and the at least one image projecting module 50 is received in the receiving groove 302 of the at least one image display screen 30. In other words, the at least one projection plate 40 and the image projecting module 50 can be respectively received in the receiving space 101 of the base body 10 and the receiving groove 302 of the at least one image display screen 30, thus the at least one projection plate 40 and the image projecting module 50 can be hidden for increasing the aspect of the display device Z. In addition, when the base body 10 and the at least one image display screen 30 are detached from the support structure 20, the portability of the at least one projection plate 40 received in the receiving space 101 and the image projecting module 50 received in the receiving groove 302 can be increased.

[Third Embodiment]

Figure 7:
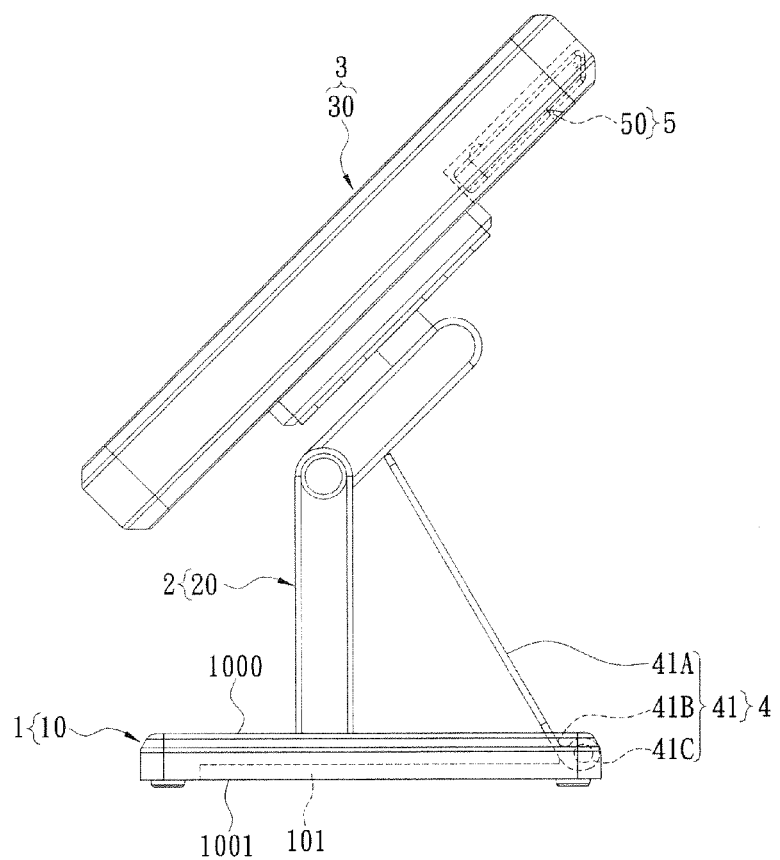
FIG. 7 shows a lateral, schematic view of the display device having a double image display function according to the third embodiment of the instant disclosure.

Referring to FIG. 7, where the third embodiment of the instant disclosure a display device Z having a double image display function, comprising: a base unit 1, a support unit 2, a first image display unit 3, a second image display unit 4 and an image projecting unit 5. The base unit 1 includes a base body 10. The support unit 2 includes a support structure 20 disposed on the base body 10. The first image display unit 3 includes at least one image display screen 30 (such as a LED display screen or a LCD display screen) movably disposed on the support structure 20 for displaying a first predetermined image (not shown). The second image display unit 4 includes at least one image display panel 41 (such as a LED display panel or a LCD display panel) movably disposed on the base body 10 for displaying a second predetermined image (not shown). The image projecting unit 5 includes an image projecting module 50 movably disposed on the at least one image display screen 30.

More precisely, the base body 10 has a receiving space 101 concaved inwardly from the bottom surface 1001 thereof and corresponding to the at least one image display panel 41. Because the at least one image display panel 41 can be pivotally disposed on the base body 10 (i.e., the at least one image display panel 41 can be rotated relative to the base body 10), the at least one image display panel 41 can be received in the receiving space 101 by clockwise rotating the at least one image display panel 41 to the end or can be positioned between the support structure 20 and the base body 10 by counterclockwise rotating the at least one image display panel 41 to the end. Moreover, the at least one image display panel 41 has an image display portion 41A contacting the support structure 20 and positioned between the top surface 1000 of the base body 10 and the support structure 20, an extending portion 41B extended from the image display portion 41A into the pivot groove 103 and contacting the inclined plane 104, and a pivot portion 41C substantially vertically extended from the extending portion 41B and pivotally disposed in the pivot groove 103.

Therefore, the same or different displaying images can be respectively shown on different viewing planes (i.e., the same or different displaying images can be shown by different viewing angles) by mating the at least one image display screen 30 and the at least one image display panel 41.

[Fourth Embodiment]

Figure 8:
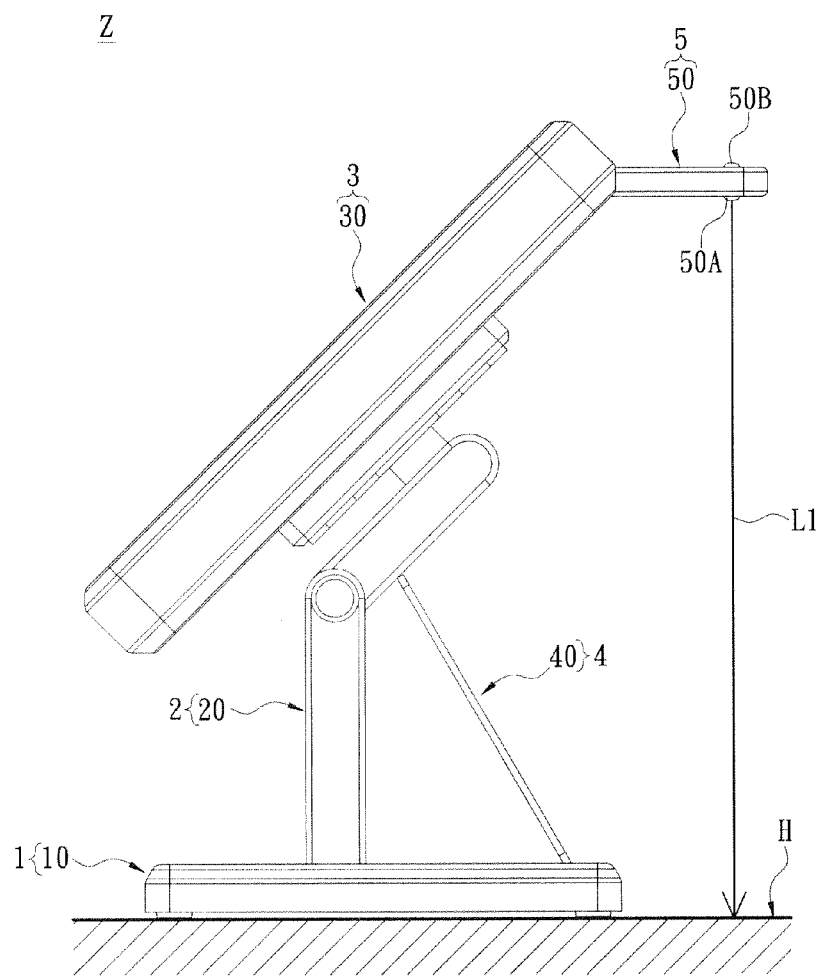
FIG. 8 shows a lateral, schematic view of the display device generated a first image light beam by the first image projecting portion according to the fourth embodiment of the instant disclosure.
Figure 9:
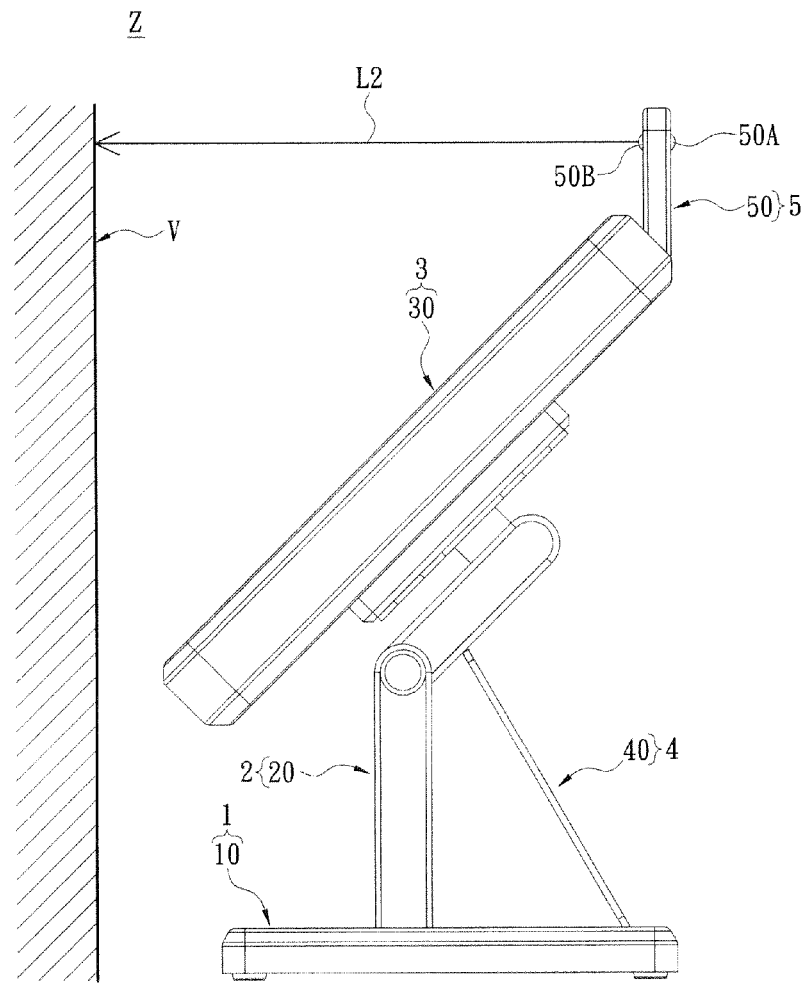
FIG. 9 shows a lateral, schematic view of the display device generated a second image light beam by the second image projecting portion according to the fourth embodiment of the instant disclosure.

Referring to FIG. 8 and FIG. 9, where the fourth embodiment of the instant disclosure a display device Z having a double image display function, comprising: a base unit 1, a support unit 2, a first image display unit 3, a second image display unit 4 and an image projecting unit 5. The at least one image projecting module 50 includes a first image projecting portion 50A facing the at least one projection plate 40 (or the at least one image display panel 41) and a second image projecting portion 50B opposite to the first image projecting portion 50A. In addition, a first image light beam L1 generated by the first image projecting portion 50A of the at least one image projecting module 50 can be projected onto a horizontal plane H (such as a desktop) adjacent to the base body 10, and a second image light beam L2 generated by the second image projecting portion 50B of the at least one image projecting module 50 can be projected onto a vertical plane V (such as a wall surface) facing the image display region 301 of the at least one image display screen 30.

Therefore, the same or different displaying images can be respectively shown on different viewing planes (i.e., the same or different displaying images can be shown by different viewing angles) by mating the at least one image display screen 30 and the at least one image projecting module 50.

In conclusion, because the at least one image display screen can be used to display the first predetermined image by itself and the at least one projection plate can be used to display the second predetermined image on the at least one projection plate (or the at least one image display panel can be used to display the second predetermined image by itself), the same or different displaying images can be respectively shown on different viewing planes. For example, if the first predetermined image and the second predetermined image are different, the second predetermined image (such as a simple image) may be one part of the first predetermined image (such as a detailed image). Moreover, the detailed image can show complete information for a cashier or a waiter, and the simple image can show simple information for a customer.

The above-mentioned descriptions merely represent the preferred embodiments of the instant disclosure, without any intention or ability to limit the scope of the instant disclosure which is fully described only within the following claims. Various equivalent changes, alterations or modifications based on the claims of instant disclosure are all, consequently, viewed as being embraced by the scope of the instant disclosure.

What is claimed is:

1. A display device having a double image display function, comprising:
    a base unit including a base body;
    a support unit including a support structure disposed on the base body;
    a first image display unit including at least one image display screen movably disposed on the support structure for displaying a first predetermined image;
    a second image display unit including at least one projection plate movably disposed on the base body;
    an image projecting unit including an image projecting module movably disposed on the at least one image display screen, wherein an image light beam generated by the at least one image projecting module is projected onto the at least one projection plate to display a second predetermined image on the at least one projection plate; and
    wherein the at least one image display screen has a receiving groove concaved inwardly from a rear face and a top face thereof and corresponding to the at least one image projecting module, and the at least one image projecting module has an end portion pivotally disposed in the receiving groove.

2. The display device of claim 1, wherein the base unit includes a plurality of non-skid pads disposed on the bottom surface of the base body, the base body has a receiving space concaved inwardly from the bottom surface thereof and corresponding to the at least one projection plate, the base body has an assembled groove formed on the top surface thereof, and the support structure has a bottom portion inserted into the assembled groove of the base body.

3. The display device of claim 1, wherein the support structure includes a fixed frame positioned on the base body and an angle adjusting element movably and pivotally disposed on the fixed frame for adjusting the inclined angle of the at least one image display screen, and the at least one image display screen is fixed on the angle adjusting element of the support structure.

4. The display device of claim 1, wherein the at least one image display screen has an image display region disposed on the front surface and opposite to the at least one projection plate for showing the first predetermined image, and the first predetermined image and the second predetermined image are the same.

5. The display device of claim 1, wherein the base body has a pivot groove formed on a lateral side thereof and an inclined plane disposed inside the pivot groove, the at least one projection plate has an image display portion contacting the support structure and positioned between the top surface of the base body and the support structure, an extending portion extended from the image display portion into the pivot groove and contacting the inclined plane, and a pivot portion substantially vertically extended from the extending portion and pivotally disposed in the pivot groove.

6. The display device of claim 1, wherein the at least one image projecting module includes a first image projecting portion facing the at least one projection plate to generate the image light beam and a second image projecting portion opposite to the first image projecting portion.

7. A display device having a double image display function, comprising:
    a base unit including a base body, wherein the base body has a receiving space concaved inwardly from the bottom surface thereof;
    a support unit including a support structure disposed on the base body;
    a first image display unit including at least one image display screen movably disposed on the support structure for displaying a first predetermined image, wherein the at least one image display screen has a receiving groove concaved inwardly therefrom;
    a second image display unit including at least one projection plate movably disposed on the base body, wherein the at least one projection plate is received in the receiving space of the base body; and
    an image projecting unit including an image projecting module movably disposed on the at least one image display screen for displaying a second predetermined image, wherein the at least one image projecting module is received in the receiving groove of the at least one image display screen.

8. The display device of claim 7, wherein the base unit includes a plurality of non-skid pads disposed on the bottom surface of the base body, the base body has an assembled groove formed on the top surface thereof, and the support structure has a bottom portion inserted into the assembled groove of the base body.

9. The display device of claim 7, wherein the support structure includes a fixed frame positioned on the base body and an angle adjusting element movably and pivotally disposed on the fixed frame for adjusting the inclined angle of the at least one image display screen, and the at least one image display screen is fixed on the angle adjusting element of the support structure.

10. The display device of claim 7, wherein the first predetermined image and the second predetermined image are the same, and the at least one image projecting module includes a first image projecting portion for generating the second predetermined image and a second image projecting portion opposite to the first image projecting portion.

11. A display device having a double image display function, comprising:
    a base unit including a base body;
    a support unit including a support structure disposed on the base body;
    a first image display unit including at least one image display screen movably disposed on the support structure for displaying a first predetermined image;

a second image display unit including at least one image display panel movably disposed on the base body for displaying a second predetermined image;

an image projecting unit including an image projecting module movably disposed on the at least one image display screen; and wherein the at least one image display screen has a receiving groove concaved inwardly from a rear face and a top face thereof and corresponding to the at least one image projecting module, and the at least one image projecting module has an end portion pivotally disposed in the receiving groove.

12. The display device of claim 11, wherein the base unit includes a plurality of non-skid pads disposed on the bottom surface of the base body, the base body has a receiving space concaved inwardly from the bottom surface thereof and corresponding to the at least one image display panel, the base body has an assembled groove formed on the top surface thereof, and the support structure has a bottom portion inserted into the assembled groove of the base body.

13. The display device of claim 11, wherein the support structure includes a fixed frame positioned on the base body and an angle adjusting element movably and pivotally disposed on the fixed frame for adjusting the inclined angle of the at least one image display screen, and the at least one image display screen is fixed on the angle adjusting element of the support structure.

14. The display device of claim 11, wherein the at least one image display screen has an image display region disposed on the front surface and opposite to the at least one image display panel for showing the first predetermined image, and the first predetermined image and the second predetermined image are the same.

15. The display device of claim 11, wherein the base body has a pivot groove formed on a lateral side thereof and an inclined plane disposed inside the pivot groove, the at least one image display panel has an image display portion contacting the support structure and positioned between the top surface of the base body and the support structure, an extending portion extended from the image display portion into the pivot groove and contacting the inclined plane, and a pivot portion substantially vertically extended from the extending portion and pivotally disposed in the pivot groove.

16. The display device of claim 11, wherein the at least one image projecting module includes a first image projecting portion facing the at least one image display panel to generate the image light beam and a second image projecting portion opposite to the first image projecting portion.

17. The display device of claim 16, wherein a first image light beam generated by the first image projecting portion of the at least one image projecting module is projected onto a horizontal plane adjacent to the base body.

18. The display device of claim 17, wherein a second image light beam generated by the second image projecting portion of the at least one image projecting module is projected onto a vertical plane facing an image display region of the at least one image display screen.

* * * * *